Patented May 11, 1943

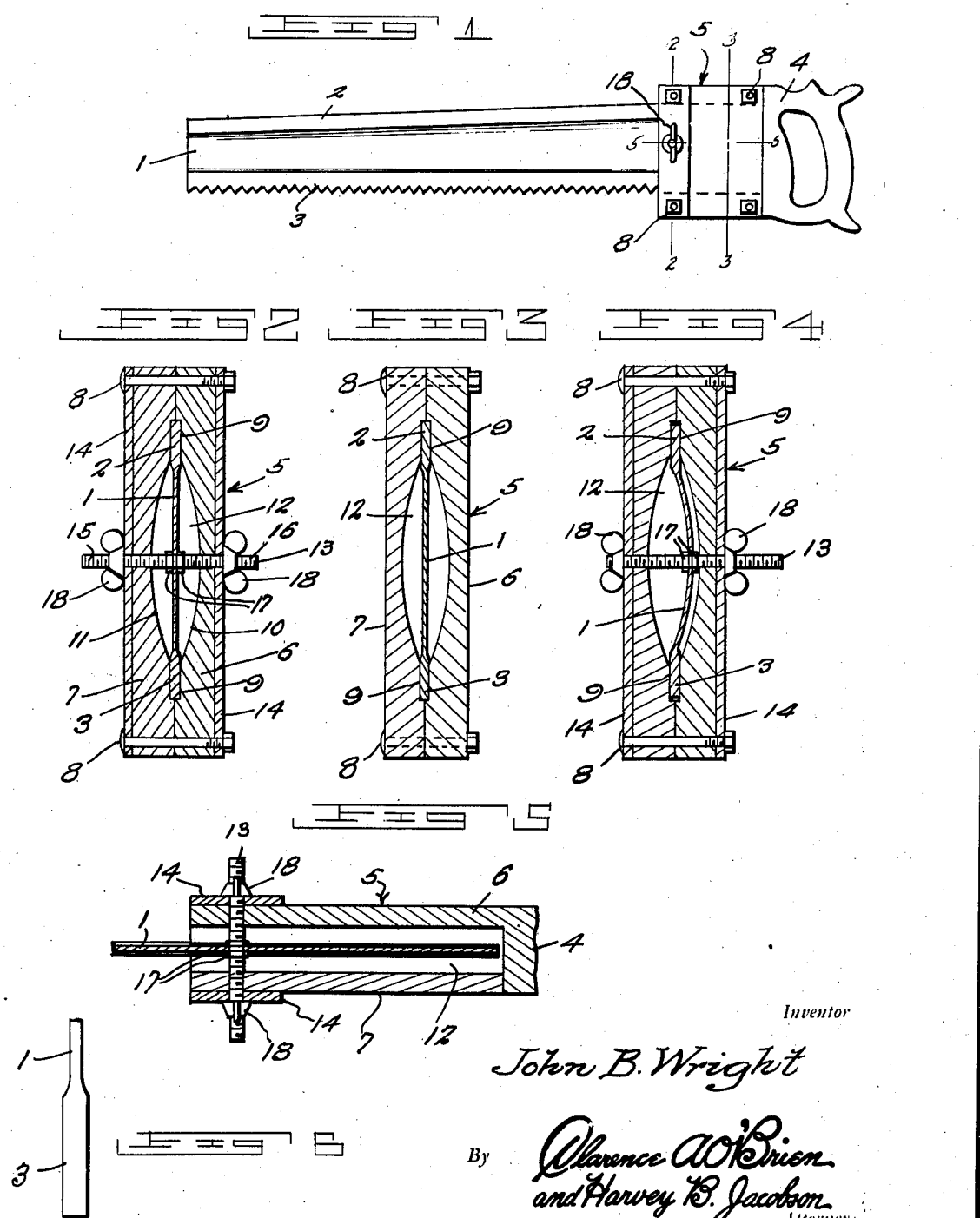

2,319,176

UNITED STATES PATENT OFFICE 2,319,176

SAW

John B. Wright, Lovingston, Va.

Application December 18, 1942, Serial No. 469,485

3 Claims. (Cl. 145—31)

My invention relates to improvements in saws, the principal object in view being to equip a cross-cut saw blade with means for variably flexing the same transversely into different set curvatures to adapt the same for scroll sawing in different arcs and curves, and without materially increasing the cost of manufacture of the saw.

Other and subordinate objects are also comprehended by my invention, all of which, together with the precise nature of my improvements and the advantages thereof, will be readily understood when the succeeding description and claims are read with reference to the drawing accompanying and forming part of this specification.

In said drawing:

Figure 1 is a view in side elevation of a saw equipped according to my invention in its preferred embodiment, Figure 2 is a view in transverse section taken on the line 2—2 of Figure 1 and drawn to an enlarged scale, Figure 3 is a similar view taken on the line 3—3 of Figure 1, Figure 4 is a view similar to Figure 2 and showing the saw blade flexed, Figure 5 is a view in horizontal section taken on the line 5—5 of Figure 1 and drawn to an enlarged scale, and Figure 6 is a fragmentary view in end elevation of the saw blade.

Referring to the drawing by numerals, according to the preferred practice of my invention, as illustrated, a saw blade 1 is provided of reduced thickness between the back and toothed marginal edges 2, 3, which are of normal blade gauge, and whereby maximum resiliency in the blade is attained for flexing of the same into different transverse curvatures. The described saw blade 1 may be constructed by grinding down the sides of an ordinary saw blade between selected edge limits, or in any other suitable manner.

The usual type saw handle 4 is provided with a front, rectangular, clamping head 5 split in the median plane thereof to provide a pair of opposed, fixed and detachable sections 6, 7. Corner bolts 8 detachably attach the sections together. The inner, opposed faces of the sections 6, 7 are rabbeted, as at 9, and the edges 2, 3 of the blade 1, at the rear end portion of said blade, are slidably fitted in the rabbets in a manner and for a purpose presently seen. Intermediate said rabbets 9, the opposed inner faces of the sections 6, 7 are transversely concaved, as at 10, 11, to provide a transversely elliptical, open, front chamber 12 in said head into which the rear end portion of the saw blade 1 extends and which permits said blade to be flexed from side to side between the edges 2, 3 thereof.

Manipulative means are provided for flexing the saw blade laterally comprising a threaded shaft 13 slidably extended transversely through the head 5 at the front end thereof and through the horizontal center of the head and saw blade 1, with ends extending out of the head 5 and through a pair of wear plates 14 opposed to opposite sides of said head and fixed thereto by the front corner bolts 8. The shaft 13 is provided with right and left hand threads 15, 16 upon opposite sides of the saw blade 1, and with a pair of clamping nuts 17, also upon opposite sides of said blade, whereby the blade is fixed to the shaft. A pair of wing nuts 18 on opposite ends of the shaft 13 bearing against the wear plates 14 provide for adjusting the shaft endwise in opposite directions, respectively, to correspondingly flex the saw blade 1.

As will be clear, under endwise adjustment of the shaft 13, the saw blade 1 may be flexed transversely into different curvatures within the chamber 12 and between the edges 2, 3 of said blade, since said edges 2, 3 have compensating sliding movement in the rabbets 9 of said head 5, and the curvature imparted to said blade 1 within the chamber 12 will be imparted to said blade between the edges 2, 3 in corresponding degree, or substantially so, throughout the length of the blade. Also, the portion of the toothed edge 3 forwardly of the head 5 will tend to curve laterally in correspondence with the curvature of the intermediate portion of the blade so that said edge is conditioned for cutting in arcuate, or circular, paths for the greater portion of the length of the blade forwardly of the head 5.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. A saw comprising a handle including a rectangular front head provided therein with a forwardly opening chamber, a saw blade having a rear end portion disposed in said chamber for lateral flexing therein and edge portions slidably mounted in said head at opposite sides of the chamber for movement to compensate for such flexing, and means to flex said portion comprising a shaft slidably extended through said head, chamber and portion transversely thereof and adjustable endwise in opposite directions to correspondingly flex said portion, and manipulative means to adjust said shaft.

2. A saw comprising a handle including a rectangular front head provided therein with a forwardly opening chamber, a saw blade having a rear end portion disposed in said chamber for lateral flexing therein and edge portions slidably mounted in said head at opposite sides of the chamber for movement to compensate for such flexing, and means to flex said portion comprising a shaft slidably extended through said head, chamber and portion transversely thereof and adjustable endwise in opposite directions to correspondingly flex said portion, and manipulative means to adjust said shaft, said blade being reduced in thickness to facilitate flexing thereof.

3. A saw comprising a handle including a rectangular front head provided therein with a forwardly opening chamber, a saw blade having a rear end portion disposed in said chamber for lateral flexing therein and edge portions slidably mounted in said head at opposite sides of the chamber for movement to compensate for such flexing, and means to flex said portion comprising a shaft slidably extended through said head, chamber and portion transversely thereof and adjustable endwise in opposite directions to correspondingly flex said portion, and manipulative means to adjust said shaft, said manipulative means comprising right and left hand screw threads on said shaft upon opposite sides of said portion, respectively, wear plates on opposite sides of the head, respectively, through which said shaft extends, and wing nuts on said shaft at opposite sides of the head for turning against said plates.

JOHN B. WRIGHT.